United States Patent [19]

Kochurova et al.

[11] 3,928,577

[45] Dec. 23, 1975

[54] PREPARATION FOR PRESERVING VEGETABLE FOOD PRODUCTS PARTICULARLY FRUITS

[76] Inventors: Alexandra Ivanovna Kochurova, Universitetsky prospekt, 23, korp. 2, kv. 72, Moscow; Zoya Vasilievna Korobkina, Gospitalnaya ul., 16, Hodpiyslnsys ul., 16; Tatiana Nikolaevna Mikhailova, Velozavodskaya ul., 3/2, kv. 30, Moscow, all of U.S.S.R.

[22] Filed: June 22, 1971

[21] Appl. No.: 155,633

Related U.S. Application Data

[63] Continuation of Ser. No. 26,422, April 7, 1970, abandoned, which is a continuation of Ser. No. 619,208, Feb. 28, 1967, abandoned.

[52] U.S. Cl. ............... 424/164; 424/162; 424/358; 424/360; 424/361; 424/365; 426/133; 426/326; 426/335
[51] Int. Cl.$^2$.......................................... A01N 13/00
[58] Field of Search ........ 424/26, 164; 99/156, 227, 99/103

[56] References Cited

UNITED STATES PATENTS 3,409,444  11/1968  Gentry et al.......................... 99/156

OTHER PUBLICATIONS

Chemical Abstracts (I) Vol. 38, 1944:803(3).
Chemical Abstracts (II) Vol. 35, 1941:4512(3).
Tablet Making — Little and Mitchell–Northern Pub. Co. Ltd. 1949, pp. 33(I), 36(II), 48(III).
Remington — Pharmaceutical Science, 1965, p. 576.

*Primary Examiner*—Leonard Schenkman
*Attorney, Agent, or Firm*—Holman & Stern

[57] ABSTRACT

A preparation for preserving vegetable food products such as fruit, e.g., grapes, stone fruit, pome fruit and citrus fruit, as well as vegetables, comprising tablets which contain potassium metabisulfite, gelatin or starch, stearic acid and salts thereof.

Said preparation is also applicable for preserving flower bulbs, rhizomes of plants, leaves and cut-off flowers.

12 Claims, No Drawings

PREPARATION FOR PRESERVING VEGETABLE FOOD PRODUCTS PARTICULARLY FRUITS

This application is a continuation of application Ser. No. 26,422 filed Apr. 7, 1970 which in turn is a continuation of application Ser. No. 619,208 filed Feb. 28, 1967, both applications now being abandoned.

1. The present invention relates to the art of storing and preservation of vegetable food products, and more particularly to a preparation for preserving vegetable food products and to a method of preserving such products.

2. Known in the art are various methods of preserving vegetable food products, particularly fruit. Thus, for example, a method is known, according to which, for inhibiting the growth and proliferation of mold fungi that destroy grape berries during storage, use is made of sulfur dioxide; sulfur dioxide is either employed by filling storing chambers periodically every 7–10 days therewith, or, else, by producing it in these chambers by burning sulfur therein. Said method, however, is disadvantageous in that the operation is quite laborious.

For storing grapes it is known to use pulverized potassium metabisulfite, as a source of sulfur dioxide, in a mixture with loose materials such as peat, granulated cork, rice hulls, sawdust. The mixture is placed onto the bottom of a box in which the grapes are to be packaged, then a sheet of paper is placed atop of the mixture, and the grapes are put onto the sheet, or the grapes are strewn with said mixture.

This method, however, cannot find any wide practical application, since the operation of preparing the mixture and packaging the grapes is labor-consuming, and the method proves to be but of small effectiveness in view of rapid decomposition of potassium metabisulfite.

It is likewise known to use potassium metabisulfite by batching it in 4–5 g doses into paper packages which are then put atop the grapes placed into boxes, or by placing potassium metabisulfite powder on the bottom of the box.

The last-mentioned method has not found any wide practical application either, being labor-consuming and of low effectiveness.

For preserving such fruit as apricots, peaches, plums or strawberry, to be subsequently processed at canneries, the use of 1 to 7 percent solution of sulfurous acid is known to be practised. This method is disadvantageous in that it involves a labor-consuming process which requires special cask containers, preparation of the solution and covering the fruit with this solution. Such a method is commonly practised at canneries when various fruit varieties are to be further processed into preserves. But this method is inapplicable for preserving fruit to be used fresh. High concentration of sulfurous acid adversely affects the organoleptic and nutritive properties of the fruit. Quite often canned fruits prove to feature undesirable flavor of sulfurous acid.

Also known is a method, according to which grapes wrapped in paper are placed into boxes provided with pads impregnated with sodium bisulfite. This method is disadvantageous in being cumbersome and inadequately effective. The pads impregnated with said antiseptic agent fail to protect the grapes against damage incurred by mold for any long period of time and rather soon become inactive.

It is also known to use pulverized sodium metabisulfite or potassium metabisulfite by filling special wax paper cases with such powders, and fixing these cases to the bottom and cover of the box with special appliances. The boxes are lined from the inside with polyethylene film or foil and provided with double walls, and their bottom and cover are additionally provided with gaskets for absorbing shocks and moisture evolved by the graps. The industrial application of such method is made difficult due to the fact that these containers and appliances are cumbersome, and the very method is costly and of low effectiveness.

The storage period and high quality of the grapes being stored can be guaranteed by this method for 3 to 4 weeks only.

According to a publication made in Chemical Abstracts Vol. 38, 1944:803(3), tablets containing potassium metabisulfite or sodium metabisulfite can be used for storing and preserving the majority of fruit. However, in this publication the composition weight, effectiveness of such tablets and the method of their employment are not specified, though these factors are essential for disclosing the method of preserving.

According to our observations, at cold storage of grapes under the conditions of a relatively high air humidity, sodium metabisulfite, due to the natural properties inherent to it, is liable to a considerably fast decomposition during some 2 months, becoming thus no longer antiseptic. Therefore tablets based on sodium metabisulfite are not fit for any prolonged storage of grapes.

It is an object of the present invention to provide such a preparation for storing vegetable food products, whose action would be more effective as compared to the preparations known heretofore, and which would ensure a longer storage period for food products.

Another object of the invention is to provide such a preparation which would preserve vegetable food products, particularly grapes, with lower concentrations of sulfur dioxide than it is the case when the fumigation method is resorted to.

Still another object of the invention is to provide such a preparation which could be used in trade from the moment vegetable food products have been harvested to the moment they are sold to consumers.

A further object of the invention is to provide such a preparation which would be easy in handling, without any special knowledge and skill required from the personnel involved.

It is also an object of our invention to improve marketable properties of the products, so that the products would preserve their natural color, taste, consistency and other characteristics over a long period of time, could be fit to be used fresh or to be processed without any additional treatment.

Yet another object of the invention is to provide such a preparation for preserving vegetable food products, which would not require large amounts of manual labor, would be easy to employ on a large scale both in large and small economics.

It is likewise an object of our invention to provide such a preserving preparation which would be possible and convenient to be used when the product is to be transported over long distances, as well as further stored either in the production premises, or in places where it will be consumed.

A further object of the invention is to provide such a preparation which could be employed with the use of now-existing containers, cold-storage chambers, transportation means and packing materials, without any additional expenditures.

It is also an object of our invention to make possible the manufacture of said preparation from easily available stock through employing the now-existing processes and conventional equipment without additional capital investments.

A further object of the present invention is to provide such a preparation, the use of which would enable mechanization of the process of its production and, to a certain extent, the process of its application.

Among the objects of the invention is the provision of a composition applicable for preserving vegetable products, especially food products, such as fruit and vegetables.

Still another object of the invention is to provide a more universal preparation on the basis of such composition, which could be applicable for preserving fresh not only fruit and vegetables, but also various vegetable stock, such as flower bulbs, rhizomes of plants, leaves and cut-off flowers, whereby the scope of application of the preparation would be broadened.

Said and other objects of the present invention are accomplished by the provision of a preparation for preserving vegetable products, which, according to the invention, is made as tablets consisting of 90 to 97 weight percent of potassium metabisulfite, 1 to 4 weight percent of gelatin or starch, 1 to 3 weight percent of magnesium stearate or calcium stearate, and 1 to 3 weight percent of stearic acid.

It is just due to the combination of the above-cited components that the preparation of the present invention features a number of advantages which will be described hereinbelow.

A composition to suit the product to be preserved is selected by appropriate proportioning of the said components.

The composition comprising 97 weight percent of potassium metabisulfite, 1 weight percent of gelatin, 1 weight percent of magnesium stearate and 1 weight percent of stearic acid is preferable, since gelatin in combination with magnesium stearate adequately strongly binds together the ingredients and makes the tablets more resistant to attrition and mechanical impacts, the composition thus becoming more suitable for such procedures where long-distance transportations are involved.

Moreover, gelatin exhibits inhibition properties, that is, it hinders the process of potassium metabisulfite decomposition and, hence, the rate of evolution of sulfur dioxide, thus prolonging the term of action of the preservative.

It is also possible to use another composition, comprising 97 weight percent of potassium metabisulfite, 1 weight percent of starch, 1 weight percent of calcium stearate and 1 weight percent of stearic acid.

Such composition is less resistant to mechanical effects, but it is cheaper. It can be used in direct contact with the product, but it is more preferable that it should be used packaged in foils of polyethylene or other similar material permeable for sulfur dioxide. Starch is a good adsorbent and an agent binding the ingredients of the tablets.

The method of preserving products with the use of said preparation is very simple to realize, and it resides in that tablets are either placed directly onto the product, such as grapes, or first enclosed into an envelope of polyethylene film or other suitable material permeable for sulfur dioxide.

Wax paper, poly film, cellophane, foil and the like materials can be used for the purpose.

In this case it will be best to uniformly distribute the tablets in cells defined by two joined sheets of polyethylene film or other suitable material. Such sheets can be used to cover the product to be stored, or to make bags therefrom.

Film with said tablets uniformly distributed therein can be inserted into boxes with vegetable products. In this case it can be put either onto the bottom of the box, or placed atop the products, or into the middle between the products, depending on the kind of product, its weight, and capacity of containers. Film with the tablets encapsulated therein can be used to line the whole interior of containers, placing the product into a bat thus formed.

For ensuring air exchange, the film can be perforated in places between the tablets, through this is not always necessary.

Depending on the kind of product, the thickness of the films may vary from 25 to 100 microns. It is also possible to use films in combination with some other less gas-permeable material.

One film can be such that gas easily penetrates through it, and the other almost impermeable. Such a combination is necessary, for example, in those cases when evolution of sulfur dioxide into the atmosphere is undesirable.

The tablets may be packed either in even rows, as it is usually done with medicines, or in a staggered manner.

The number of tablets per unit area of the film can be varied depending on the kind of products for which they are used, gas permeability of the film and storage temperature.

When storing grapes, the tablets can be placed directly onto the berries, observing that the distribution of the tablets over the surface of the grapes be uniform. For stone fruit such as plums, cherries, sweet cherries, apricots, and for pome fruit, such as apples, pears and citrus fruit, whose skin is highly susceptible to sulfur dioxide, we recommend that said tablets be enclosed in films made of polyethylene or other suitable material, such as poly film, wax paper, cellophane, and the like. It is desirable, that in this case both separate sheets or plates and bags accommodating the tablets should be used, the film being perforated to ensure free circulation of air.

The present method thus permits mechanization of the process of manufacturing special packaging materials with the tablets which are the source of sulfur dioxide. Having been industrially prepared and pre-packed, said packaging materials can be delivered to the places where fruit and vegetables are to be harvested just during the harvesting seazon and used with minimum time expenditures for their packing. It will suffice, for example, to put one or two sheets with the tablets onto the bottom and atop the fruit in each box.

Many vegetable products can be stored for a longer period of time, if the tablets used are enclosed in film materials, since films themselves hinder the transfer of carbon dioxide, evolved by the fruit while breathing, to the atmosphere. This carbon dioxide is thus accumulated around the fruit and protects vegetable products against overripening and premature withering. Besides, the film isolates the product from contact with the tablets, which are liable to cause decoloration of tender products.

The invention disclosed herein, due to a constant source of sulfur dioxide which evolves directly within the container accommodating the product in small concentrations, thus provides for a better and longer preservation of the natural taste, color and consistency of vegetable products.

The present invention is believed to find wide practical application due to the simplicity of the manufacturing process and easy handling of the preparation.

For packaging the tablets into film materials use can be made of conventional equipment, such as is now in use for packaging drugs or buttons. The manufacture of film sheets with the tablets enclosed therein will require no considerable expenditures. The film sheets thus produced can be then cut to any required size.

Sheets of different sizes can be used for covering various vegetables. Small bags or containers of different capacity can be made from such sheets for storing vegetable products such as sweetcherries, cherries, apricots, plums and the like intended either to be used fresh, or processed for canning to prepare compotes, juices, sauces, jams, etc. therefrom. This, on the one hand, will make it possible to do away with those strenuous schedule conditions which are associated with processing such perishable season stock as the above-listed fruit, and, on the other hand, partially obviate sulfitation of fruit in sulfurous acid solution. When storing stone fruit and berries with the use of polyethylene sheets with the hereinproposed tablets enclosed therein, the amount of sulfurous acid accumulated in the fruit proves to be smaller than in case of sulfitizing the fruit in sulfurous acid solution. As a consequence, the quality of the ready product will be higher when using the method proposed by us.

The present invention can be easily employed not only when harvesting and packaging the fruit, but also after transportation thereof. Without disturbing grapes and other fruit, the tablets are simply added, or the above-described sheets are used to cover the fruit from above.

Said sheets can be used for making small bags for storing cut-off flowers, flower bulbs, rhizomes and the like.

For a better understanding of the present invention, given hereinbelow are examples by way of illustration.

EXAMPLE 1

The following varieties of grapes have been tested: "Oktyabrsky", "Nimrang" and "Tiphy pink". Tablets were used, comprising 97 weight percent of potassium metabisulfite, 1 weight percent of calcium stearate, 1 weight percent of starch and 1 weight percent of stearic acid. The tablets weighed 0.5 g and were taken in an amount of 40 pieces per 8 kg of the product. The tablets were placed atop the grapes put into boxes and delivered to a refrigerator.

The grapes packed with said tablets was stored in a coldstorage chamber at a temperature of 0°–1°C. and relative humidity of air of 87–93% over a period of 6–8 months. To the end of the storage period the berries completely preserved their natural color, taste, aroma, without any adverse odors or flavors. The berries featured smooth surface with a wax bloom, resilient consistency, and firmly held to stems without falling off.

For illustration given hereinbelow is a table in which results are presented, obtained when storing the above-mentioned 3 varieties of grapes with the tablets of the present invention. In column 5 of the table, for the sake of comparison, results are listed, obtainable when storing grapes with recourse to the prior-art method, namely, when using powder of potassium metabisulfite.

Table

| Grape quality | Nimrang variety with tablets, % | Tiphy pink variety with tablets, % | Oktyabrsky variety | |
|---|---|---|---|---|
| | | | with tablets, % | with powder of potassium metabisulfite, % |
| 1 | 2 | 3 | 4 | 5 |
| 15 days after picking and transportation | | | | |
| Standard | 99.5 | 99.7 | 99.3 | 99.4 |
| Fall | 0 | 0 | 0.6 | 0.4 |
| Decayed | 0.5 | 0.3 | 0.1 | 0.2 |
| 5 months after picking and transportation | | | | |
| Standard | 99.5 | 99.7 | 99.3 | 34.5 |
| Fall | 0 | 0 | 0.6 | 51.5 |
| Decayed | 0.5 | 0.3 | 0.1 | 14.0 |
| 6 months after picking and transportation | | | | |
| Standard | 92.0 | 92.0 | 99.3 | 0 |
| Fall | 3.5 | 6.0 | 0.6 | 78.0 |
| Decayed | 4.5 | 2.0 | 0.1 | 22.0 |
| 7 months after picking and transportation | realized | realized | | |
| Standard | | | 98.8 | 0 |
| Fall | | | 0.6 | 0 |
| Decayed | | | 0.6 | 100.0 |

Table-continued

| Grape quality | Nimrang variety with tablets, % | Tiphy pink variety with tablets, % | Oktyabrsky variety with tablets, % | Oktyabrsky variety with powder of potassium metabisulfite, % |
|---|---|---|---|---|
| 1 | 2 | 3 | 4 | 5 |
| 8 months after picking and transportation | realized | realized | | |
| Standard | | | 96.3 | 0 |
| Fall | | | 2.3 | 0 |
| Decayed | | | 1.4 | 100.0 |

As can be seen from the table, grapes packaged and stored with powder of potassium metabisulfite were considerably deteriorated after 5 months of storage.

EXAMPLE 2

Sweet cherries of "Souslepskaya black" variety and cherries of "Vladimirskaya" variety packaged in conventional wood boxes containing 7 kg of berries each, were placed for storage into a cold-storage chamber where the temperature was 0°–1°C.

Into each box atop the berries there were placed 2 polyethylene sheets with 20 tablets weighing 0.5 g each enclosed therein.

The tablets consisted of 97 weight percent of potassium metabisulfite, 1 weight percent of gelatin, 1 weight percent of calcium stearate and 1 weight percent of stearic acid.

Sweet cherries proved to be well preserved after 2 months of storage, and cherries, after 2.5 months, respectively. The berries featured natural taste, pleasing appearance, smooth glossy surface of the skin and normal resilient consistency.

EXAMPLE 3

Plums of "Ispolinskaya" variety were stored so that each box of 9 kg capacity was covered with polyethylene film, that contained evenly distributed tablets, whose number was 40, weight 0.5 g each and composition as stated in Example 1. Perforations were made in the film between the tablets. After 65 days of storage in a refrigerator at a temperature of 0°–1°C. the fruit featured natural appearance, characteristic of ripe fruit, resilient consistency, normal color of the skin, and good taste without any alien deterioration properties.

EXAMPLE 4

Apples of "Oporto" and "Rennet of Orleans" varieties were stored in a cold-storage chamber under the conditions described in Example 3 during 7 months under a film with 40 tablets weighing 0.5 g each and having the same composition as in Example 1. When inspected after the storage, the product did not exhibit any features that could deteriorate the taste, color, aroma or consistency of the fruit. The apples retained their natural appearance, resilient consistency and succulence.

In boxes of 23 kg capacity each only a few (1–3) decayed items of fruit were found, which amounts to less than 1 percent.

What is claimed is:

1. A preparation in the form of tablets for preserving vegetable products comprising 90 to 97 weight percent of potassium metabisulfite, 1 to 4 weight percent of a component selected from the group consisting of starch and gelatin, 1 to 3 weight percent of a component selected from the group consisting of magnesium stearate and calcium stearate, and 1 to 3 weight percent of stearic acid.

2. A preparation for preserving vegetable food products as claimed in claim 1, comprising 97 weight percent of potassium metabisulfite, 1 weight percent of gelatin, 1 weight percent of magnesium stearate and 1 weight percent of stearic acid.

3. A preparation for preserving vegetable food products as claimed in claim 1, comprising 97 weight percent of potassium metabisulfite, 1 weight percent of starch, 1 weight percent of calcium stearate and 1 weight percent of stearic acid.

4. A method of preserving vegetable products with the use of the preparation as claimed in claim 1, which comprises placing said preparation in the vicinity of the product in such a manner that the product should be in contact with sulfur dioxide evolving from said tablets.

5. A method of preservation as claimed in claim 4, according to which said tablets are disposed directly on the product so as to ensure contact between said tablets and the product.

6. A method of preserving vegetable products with the preparation as claimed in claim 1, which comprises enclosing the tablets in an envelope of a gas-impervious material selected from the group consisting of polyethylene, cellophane and paper, that is permeable to sulfur dioxide which contacts the product that is in the vicinity of said tablets.

7. A method as claimed in claim 6, wherein said tablets are arranged in cells between two sheets of polyethylene film that are joined together, said sheets being used to cover the product.

8. A method as claimed in claim 6, wherein sheets made of polyethylene film are used to accomodate said tablets therebetween, with perforations provided in the film between said tablets.

9. A method of preservation as claimed in claim 4, wherein the vegetable products are grapes.

10. A method of preservation as claimed in claim 4, wherein the vegetable products are stone fruits.

11. A method of preservation as claimed in claim 4, wherein the vegetable products are pome fruits.

12. A method as claimed in claim 4, wherein the vegetable products are citrus fruits.

* * * * *